Oct. 31, 1933.                R. W. HOWLETT              1,932,462
                                PIPE CUTTER
                            Filed Aug. 10, 1932
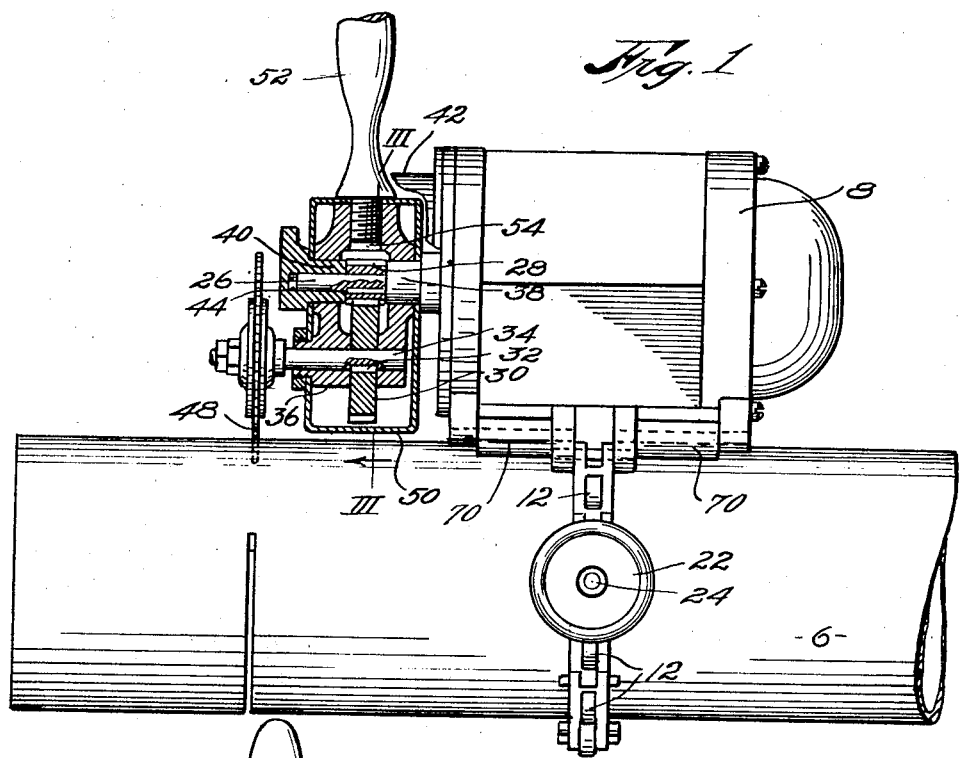
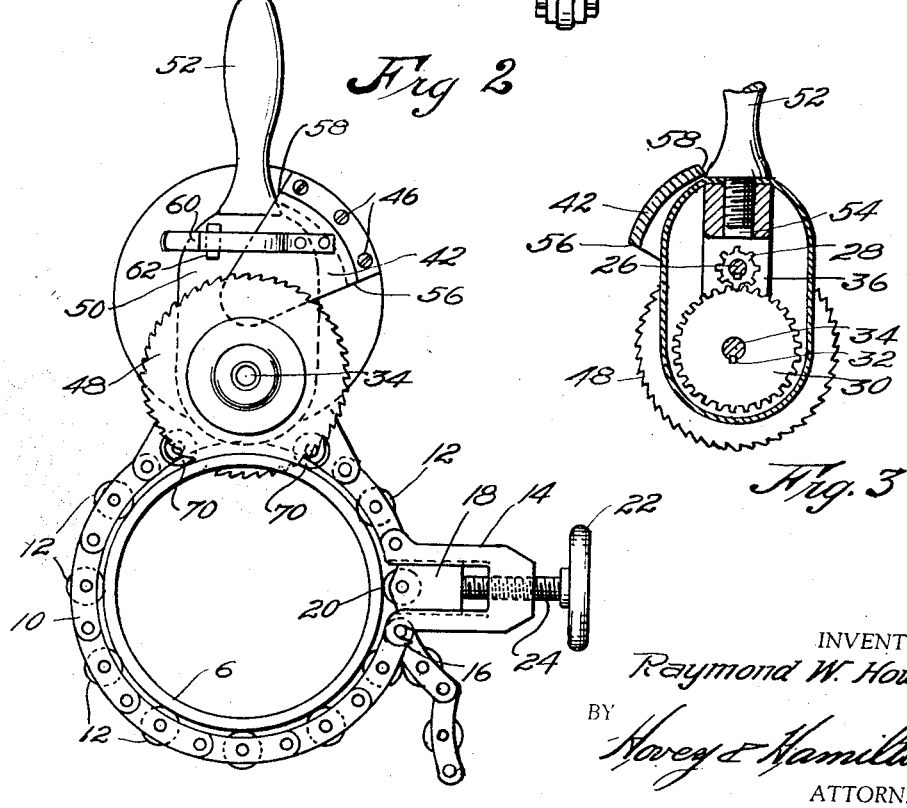
INVENTOR.
Raymond W. Howlett.
BY
Hovey & Hamilton,
ATTORNEYS.

Patented Oct. 31, 1933

1,932,462

UNITED STATES PATENT OFFICE 1,932,462

PIPE CUTTER

Raymond W. Howlett, Kansas City, Mo.

Application August 10, 1932. Serial No. 628,118

7 Claims. (Cl. 29—69)

This invention relates to pipe handling equipment and particularly to apparatus used in cutting pipes, conduits, tubing, or similar elements upon which it is desired to operate with a power-driven cutter, and the primary object of this invention is to provide a portable, motor-actuated cutter which may be affixed to the pipe being cut and moved therearound in a plane transversely thereof as the severing action progresses.
One of the salient aims of the instant invention is the contemplation of a pipe cutter having a motor with which is associated new, unique and novel structure whereby the power-driven cutter of the machine is moved to position at a desired point upon the outer periphery of the pipe and then carried around the pipe being cut without the employment of involved and complicated mechanism.

A further object of this invention is the provision of a pipe cutter of the broad character mentioned, having as a part thereof, means for limiting the movement of a driven shaft about a limiting the movement of a driven shaft about a drive shaft; means for yieldably maintaining said driven shaft at one end of its path of travel; and a stop for so limiting the said path of travel which is carried in a special manner and has formed as a part thereof, a journal or bearing for the projected end of the drive shaft of the cutting apparatus.
Many minor objects of the invention will appear during the course of the specification, referring to the accompanying drawing, wherein:

Figure 1 is a partial, central, sectional view of a pipe cutting tool embodying this invention.
Fig. 2 is an end elevation of the same, and, Fig. 3 is a detailed, sectional view taken along line III—III of Fig. 1.

It is understood that a pipe cutter embodying the features of this invention might be used with various forms of pipes or casings, and it is also understood that such pipes may be of any diameter. The adjustability of the hereinafter described clamping mechanism is ample to provide for such variation.
In severing pipes of exceptionally large diameter, it is customary to use a pipe cutter of the character contemplated by this invention, and in the instance shown, pipe 6 may be of such a character, and at the beginning of the operation motor 8 is clamped to pipe 6 through the medium of chain 10, each link of which preferably carries a roller 12 to bear against the outer periphery of pipe 6 so that motor 8 and all parts associated therewith might travel around pipe 6 in a plane transversely thereto.

This planetary movement on the part of the pipe cutting machine permits the hereinafter described cutter to sever the annular wall of pipe 6 as chain 10 securely clamps all parts upon the pipe being cut. Chain 10 is hooked to yoke 14 as shown at 16, after which sliding block 18, having a roller 20 thereon, is moved tightly against pipe 6 by operating wheel 22 that has a shank 24 in screw-threaded engagement with yoke 14, as shown in Fig. 2.

Motor 8 has a projected, driven shaft 26, to which is keyed pinion 28 that is in mesh with gear 30, keyed as at 32 to driven shaft 34. A bracket or similar body 36 maintains pinion and gear 28 and 30 respectively in mesh and likewise associates the parts together so that driven shaft 34 might be moved around drive shaft 26.

This expedient is accomplished by mounting body 36 upon bearings 38 and 40 respectively, the former being carried by motor 8 while the latter is created by one end of a stop member 42, which likewise forms a bearing 44 for the projected end of drive shaft 26. This stop 42 is rigidly secured to motor 8 by suitable means, such as the machine screws 46. A disk-shaped cutter 48 is carried by driven shaft 34 and a housing 50 encases the parts as shown in Fig. 1. A handle 52, screw-threaded into a hole 54 formed in body 36, projects as illustrated to permit the operator to grasp the same and move, not only driven shaft 34 around drive shaft 26, but also all of the machine around pipe 6.

When motor 8 is first clamped to pipe 6, cutter 48 is out of engagement with pipe 6 and the edge 56 of stop 42 is in engagement with one side of housing 50. While motor 8 drives cutter 48, handle 52 is grasped and sufficient force applied thereto to draw shaft and cutter 34 and 48 respectively around driven shaft 26 until cutter 48 has cut through the wall of pipe 6 at the point selected. This point should be somewhere above the longitudinal center so that as cutter 48 passes around beneath pipe 6, binding will not take place. After cutter 48 has been drawn down to the position shown in Fig. 2, edge 58 is engaged by handle 52 and receives part of the force which draws the entire machine around pipe 6.

It is desirable to provide means for yieldably maintaining the structure just described in the position shown in Fig. 2, and to carry out this point of the invention, there is provided a member in the form of a flat spring 60 that engages over a lug 62 to yieldably hold parts against accidental movement in a counter-clockwise direction when viewing Fig. 2. This yieldable member 60 is carried by stop 42 and lug 62 is integral with housing 50. Reference to Fig. 1 teaches the manner in which stop 42 bridges the distance between the end of motor 8 and the projected end of shaft 26.

To stabilize motor 8, there are provided rollers 70 on each side of the connection with chain 10. These rollers 70 prevent any longitudinal rocking movement on the part of motor 8.

Associating parts in the manner above specified with a rotary cutter 43 creates a pipe cutting machine that is not only quick in action, but requires but a minimum amount of manipulation on the job. The device is cheap to construct, rugged, and contains but a few number of parts, all of which enhances its value as a unique piece of equipment susceptible of performing the job of cutting pipes of various materials and diameters at a minimum cost.

Having thus described the invention, what is claimed as new and desired to be secured by Letters Patent is:

1. A pipe cutter comprising a motor having a projected drive shaft; means to clamp said motor to the pipe being cut for planetary movement therearound; a driven shaft geared to the drive shaft; a cutter carried by the driven shaft; and structure associated with both said drive shaft and driven shaft whereby the latter may be rotated around the former, said means to clamp the motor to the pipe comprising a series of links forming a chain and a plurality of rollers carried by the chain bearing against the pipe.

2. A pipe cutter comprising a motor having a projected drive shaft; means to clamp said motor to the pipe being cut for rotation therearound in a plane transversely thereof; a driven shaft geared to the drive shaft; means for rotatably supporting the driven shaft upon said drive shaft as power is transmitted from the latter to the former; and a cutter carried by the driven shaft, said means to clamp the motor to the pipe comprising a series of links forming a chain, a yoke joining the ends of the chain, a series of rollers carried by the chain, and a roller carried by said yoke, all of the rollers bearing against the pipe.

3. A pipe cutter comprising a motor having a projected drive shaft; means to clamp said motor to the pipe being cut for rotation therearound in a plane transversely thereof; a driven shaft rotatably carried by the drive shaft for movement therearound; gears to transmit power from the drive shaft to the driven shaft; a cutter carried by the driven shaft and rollers mounted on the motor adjacent each end thereof, said means to clamp the motor to the pipe comprising a chain secured to the motor between the said rollers and a plurality of rollers carried by the chain, all of the rollers bearing against the pipe being cut.

4. A pipe cutter comprising a motor having a projected drive shaft; means to clamp said motor to the pipe being cut for rotation therearound in a plane transversely thereof; a driven shaft rotatably carried by the drive shaft for movement therearound; a gear train interconnecting said driven and drive shafts; a cutter carried by the driven shaft for rotation therewith; a stop to limit the movement of the driven shaft around the drive shaft; and a yieldable member to retain said driven shaft at one end of its path of travel.

5. A pipe cutter comprising a motor having a projected drive shaft; means to clamp said motor to the pipe being cut for rotation therearound in a plane transversely thereof; a driven shaft rotatably carried by the drive shaft for movement therearound; a gear train interconnecting said driven and drive shafts; a cutter carried by the driven shaft for rotation therewith; a stop mounted on the motor to limit the movement of the driven shaft around the drive shaft; and a yieldable member on the said stop to retain said driven shaft at one end of its path of travel.

6. A pipe cutter comprising a motor having a projected drive shaft; means to clamp said motor to the pipe being cut for rotation therearound in a plane transversely thereof; a driven shaft rotatably carried by the drive shaft for movement therearound; a gear train interconnecting said driven and drive shafts; a cutter carried by the driven shaft for rotation therewith; a stop to limit the movement of the driven shaft around the drive shaft; and a bearing for the projected end of said drive shaft formed by said stop.

7. A pipe cutter comprising a motor having a projected drive shaft; means to clamp said motor to the pipe being cut for rotation therearound in a plane transversely thereof; a driven shaft rotatably carried by the drive shaft for movement therearound; a gear train interconnecting said driven and drive shafts; a cutter carried by the driven shaft for rotation therewith; a housing for said gear train; a handle on the housing to operate the cutter; a stop carried by the motor and disposed in the path of travel of said handle to limit the movement thereof and of the driven shaft around the drive shaft; a bearing for the projected end of the drive shaft formed by said stop; and a yieldable member to retain said driven shaft in position at one end of its path of travel.

RAYMOND W. HOWLETT.